(12) United States Patent
Vrame et al.

(10) Patent No.: US 10,473,253 B2
(45) Date of Patent: Nov. 12, 2019

(54) BELL END ADAPTER ARRANGEMENT

(71) Applicant: S-P Products, Inc., Elk Grove Village, IL (US)

(72) Inventors: Peter A. Vrame, Elk Grove Village, IL (US); Mikel Bishka, Elk Grove Village, IL (US)

(73) Assignee: S-P Products Inc., Elk Grove Village, IL (US)

( * ) Notice: Subject to any disclaimer, the term of this patent is extended or adjusted under 35 U.S.C. 154(b) by 140 days.

(21) Appl. No.: 15/411,536

(22) Filed: Jan. 20, 2017

(65) Prior Publication Data

US 2017/0211739 A1 Jul. 27, 2017

Related U.S. Application Data

(60) Provisional application No. 62/281,582, filed on Jan. 21, 2016.

(51) Int. Cl.
| | |
|---|---|
| *F16L 47/02* | (2006.01) |
| *F16L 41/00* | (2006.01) |
| *F16L 47/30* | (2006.01) |
| *H02G 3/04* | (2006.01) |

(52) U.S. Cl.
CPC ............ *F16L 41/002* (2013.01); *F16L 47/02* (2013.01); *F16L 47/30* (2013.01); *H02G 3/0406* (2013.01)

(58) Field of Classification Search
CPC ......... F16L 41/002; F16L 47/30; F16L 47/02; F16L 58/06; F16L 25/0018; F16L 25/03; F16L 37/02; F16L 37/008; F16L 41/08; F16L 41/082; F16L 13/10; F16L 13/11; F16L 13/116; F16L 13/113; F16L 21/03; F16L 25/025; H02G 3/0406; Y10T 29/49911
USPC .................................................. 285/230, 231
See application file for complete search history.

(56) References Cited

U.S. PATENT DOCUMENTS

| | | | | |
|---|---|---|---|---|
| 1,222,806 | A | * | 4/1917 | Schmitt .................... F16L 41/14 285/206 |
| 2,443,145 | A | * | 6/1948 | Payne .................... F16L 17/073 277/622 |
| 2,493,577 | A | * | 1/1950 | Franklin .................. F16L 37/48 285/110 |

(Continued)

FOREIGN PATENT DOCUMENTS

| | | | | |
|---|---|---|---|---|
| DE | 2600415 A1 | * | 8/1976 | ............. B28B 19/00 |
| DE | 20002216 U1 | * | 4/2000 | ............. E03D 1/012 |

*Primary Examiner* — David Bochna
*Assistant Examiner* — James A Linford
(74) *Attorney, Agent, or Firm* — Wood, Phillips, Katz, Clark & Mortimer

(57) ABSTRACT

A bell end adapter arrangement facilitates assembly of conduit sections through which associated electrical wiring and/or cables are routed. The arrangement includes a bell end adapter assembly having an outer bell end adapter, and an inner sleeve portion fixed within the outer adapter. The adapter assembly particularly facilitates routing of wiring from a conduit section positioned within a concrete slab or like flooring element, with the adapter assembly configured to be inserted into the slab and joined to the conduit section disposed within the slab. The adapter assembly has a outwardly flared, bell-shaped open mouth which is configured to receive a second conduit section through which wiring form the first conduit section is routed.

14 Claims, 3 Drawing Sheets

(56) References Cited

U.S. PATENT DOCUMENTS

| | | | | |
|---|---|---|---|---|
| 6,389,764 B1 * | 5/2002 | Stubler | ............... | E01D 19/16 52/220.8 |
| 8,001,737 B1 * | 8/2011 | Price | .................... | F16L 5/10 248/346.5 |

* cited by examiner

PVC X TAPER FITTING

| Pipe Size | A | B | C | D | E | F | G |
|---|---|---|---|---|---|---|---|
| 1/2 | .840 | .75 | .70 | .735 | 1.55 | .72 | .565 |
| 3/4 | 1.05 | .75 | .725 | .940 | 1.575 | .925 | .80 |
| 1" | 1.31 | 1.00 | .905 | 1.18 | 2.005 | 1.165 | 1.00 |
| 1-1/4 | 1.66 | 1.00 | 1.00 | 1.525 | 2.10 | 1.510 | 1.32 |
| 1-1/2 | 1.90 | 1.25 | 1.09 | 1.765 | 2.465 | 1.745 | 1.55 |
| 2" | 2.375 | 1.375 | 1.11 | 2.23 | 2.610 | 2.205 | 1.80 |
| 2-1/2 | 2.875 | 1.50 | 1.18* | 2.68* | 2.975* | 2.78* | 2.65* |
| 3" | 3.50 | 1.625 | 1.22 | 3.30 | 3.030 | 3.270 | 3.05 |
| 3.5 | 4.00 | 1.81 | 1.50 | 3.885 | 3.495 | 3.760 | 3.50 |
| 4" | 4.50 | 1.81 | 1.475 | 4.275 | 3.510 | 4.245 | 3.99 |

BELL END ADAPTER ARRANGEMENT

CROSS-REFERENCE TO RELATED APPLICATIONS

This application claims priority of Provisional Ser. No. 62/281,582, filed Jan. 21, 2016, entitled "Bell End Adaptor", the disclosure of which is hereby incorporated by reference in its entirety.

FEDERALLY SPONSORED RESEARCH OR DEVELOPMENT

Not Applicable.

MICROFICHE/COPYRIGHT REFERENCE

Not Applicable.

FIELD OF THE INVENTION

This invention pertains to couplings and adapters for conduits and tubular members, and in more particularly to an arrangement including a bell end adapter assembly configured to facilitate connection of electrical conduit sections, wherein a first section is disposed in an associated floor or concrete slab, and a second section is joined thereto by the present adapter assembly. Associated electrical wiring or the like can be arranged to extend from within the concrete slab, and through the conduit sections joined to each other by the adapter assembly.

BACKGROUND OF THE INVENTION

Electrical conduit and related accessories may be made from a variety of materials such as PVC, thin wall metal, heavy wall metal, flexible tubing (MC cable and other types of flexible cable), as well as other materials known to those skilled in the art. Often-times, these materials are used in combination and therefore, adapters and couplings must be used to join the materials. Couplings are generally used to connect tubing, such as electrical conduit to various other forms of electrical tubing and support structures. In some applications, electrical conduit can be arranged to extend at least partially within a floor structure, such as a concrete slab.

In the course of a typical installation, it may be necessary for electrical workers to provide conduit components which extend from within a concrete slab or like floor element for connection with other components positioned about the concrete slab. Bearing in mind that electrical wiring positioned within the conduit components must be threaded and directed through the various components, it is desirable to provide an arrangement which facilitates assembly of the components, while promoting efficient routing of the associated wiring.

The present invention is directed to arrangement which facilitates assembly of conduit sections and like tubular structures, as may typically be used in conjunction with electrical wiring, with the present invention particularly suited for application in which components are positioned in a concrete slab or like flooring structure.

SUMMARY OF THE INVENTION

In accordance with the present invention, a bell end adapter arrangement comprises a bell end adapter assembly which is configured to facilitate convenient and efficient connection of first and second sections of tubular electrical conduit, which sections may typically comprise PVC. The invention contemplates disposition of the first section in a concrete slab, with the present adapter assembly configured from fitment and securement to the first section, with the adapter assembly extending above the surface of the concrete slab. This arrangement facilitates connection of the second section to the first section by insertion of the second section into the adapter assembly, thus permitting electrical wiring or the like to be routed to extend from the first section, through the adapter assembly, and into the second conduit section. Efficient placement of associated electrical components above the floor structure is thus facilitated.

In accordance with the illustrated embodiment, the present bell end adapter assembly in positioned in operative association with a concrete slab or like flooring element, with the arrangement including a first conduit section positioned within the concrete slab, as typically found in a construction environment. The present arrangement further comprises a second conduit section, position above the slab, which is arranged for connection to the first conduit section by the present bell end adapter assembly. Associated electrical wiring or the like ordinarily extends from within the first conduit section, and is threaded and routed through the adapter assembly and into the second conduit section attendant to assembly and use.

The bell end adapter assembly of the present invention has a generally tubular configuration, and includes inner and outer components arranged in fixed relationship with each other. The adapter assembly includes a first end defining a first opening for disposition in the first section of electrical conduit, and a second end defining a second opening for receiving the second section of electrical conduit. Notably, the adapter assembly is configured to extend above the concrete slab, with the second end thereof being accessible to facilitate connection of the second section of electrical conduit thereto.

As noted, the present bell end adapter assembly includes inner and outer components, and comprises an outer bell end adapter, and an inner sleeve member extending below the outer bell end adapter, the inner sleeve member has an upper portion disposed within the bell end adapter, and a lower portion extending below the bell end adapter and extending into the first section of electrical conduit.

To facilitate efficient use, the second end of the adapter assembly has an outwardly flared, generally bell-shaped configuration to facilitate insertion of the second section of electrical conduit into the adapter.

To facilitate assembly and to ensure secure fitment, an outer surface of the inner sleeve member, at the first end of the adapter assembly, has an inwardly tapered configuration, while an inside surface of the first section of electrical conduit, positioned in the concrete slab, has a mating, outwardly tapered configuration for receiving the first end of the adapter body, thus providing a tapered interface between the components. In the preferred form, the inwardly tapered configuration of the first end of the adapter body is tapered about 3 degrees.

Secure fitment and assembly of the components of the present invention can be effected by the provision of an adhesive composition on mating surfaces of the components, including at an interface of the tapered outer surface of the inner sleeve member, and the tapered inner of the first section of electrical conduit.

To facilitate assembly, the inner sleeve member of the adapter assembly defines an annular stop surface for engagement with the second conduit section. Notably, an inside diameter of the inner sleeve member of the adapter assembly is the same as an inside diameter of the first conduit section. These inside diameters are also preferably the same as an inside diameter of the second conduit section, thus facilitating routing of wiring or cables without snagging or the like.

Notably, present invention permits the bell end adapter assembly to be assembled with other components either before or after the concrete is poured. The arrangement desirably acts to avoid costly repairs which can occur if there is conduit breakage during the concrete pour. Smooth edges of the adapter assembly permit wiring, cables, etc., to be routed and pulled through the components without snagging or damage, promoting fast and efficient installation. The components can be provided in a wide range so sizes, such as from ½ inch to 4 inches, with the arrangement being well-suited for use with a wide range of application, particularly PVC conduit in duct banks.

Other features and advantages will become apparent from the following detailed description, the accompanying drawings, and the appended claims.

DETAILED DESCRIPTION OF THE PREFERRED EMBODIMENT

Figure 1:
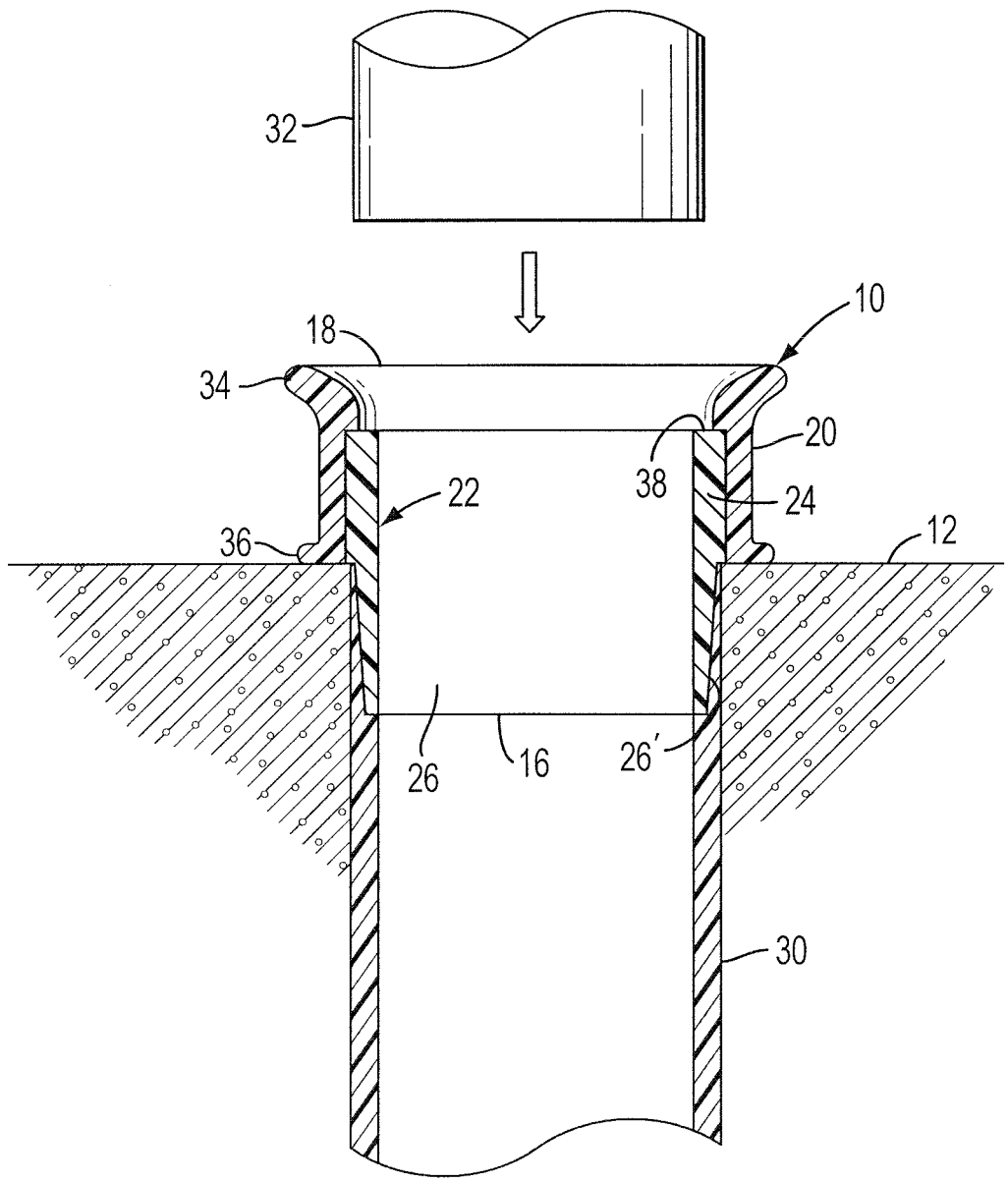
FIG. 1 is a diagrammatic side elevational view of a bell end adapter arrangement in accordance with the present invention, showing the present end adapter assembly in cooperative disposition with an concrete slab.
Figure 2:
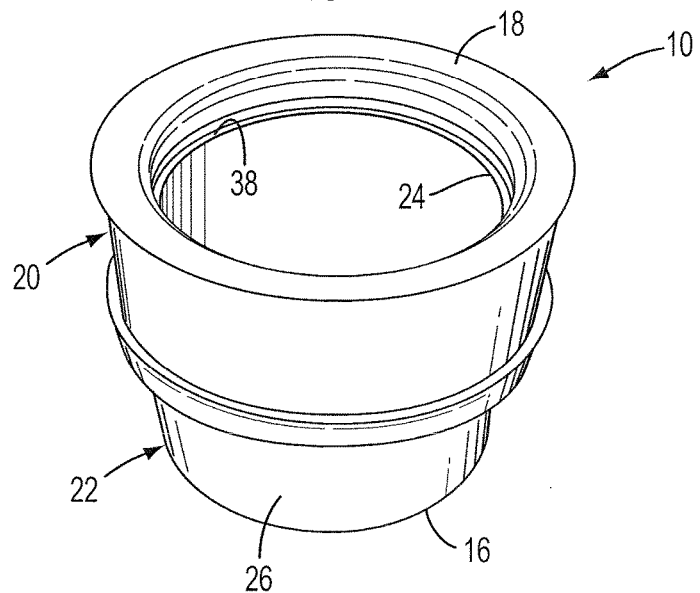
FIG. 2 is a perspective view of the bell end adapter assembly of the present invention.

While the present invention is susceptible of embodiment in various forms, there is shown in the drawings, and will hereinafter be described, a presently preferred embodiment, with the understanding that the present disclosure is to be considered as an exemplification of the invention, and is not intended to limit the invention to the specific embodiment illustrated.

Referring to FIG. 1, a bell end adapter assembly 10 embodying the present invention is positioned to extend into and above a concrete slab 12, such as for the foundation of a building, the floors of multi-story building, and the like. As will be further described, the bell end adapter assembly 10 of the present invention has a generally tubular configuration, and comprises inner and outer components arranged in fixed relationship with each other.

The adapter assembly 10 has a first, lower end 16, defining a first opening for disposition in the first section of electrical conduit, and a second, upper end 18, defining a second opening for receiving the second section of electrical conduit, with the adapter assembly defining an internal passage extending between the lower and upper ends. The adapter assembly 10 can be efficiently formed from suitable PVC material.

As noted, the present bell end adapter assembly 10 includes inner and outer components, and comprises an outer bell end adapter 20, and an inner sleeve member 22 extending within and below the outer bell end adapter. The inner sleeve member 22 has an upper portion 24 disposed within the bell end adapter, and a lower portion 26 extending below the bell end adapter 20 and extending into the first section of electrical conduit.

Figure 3:
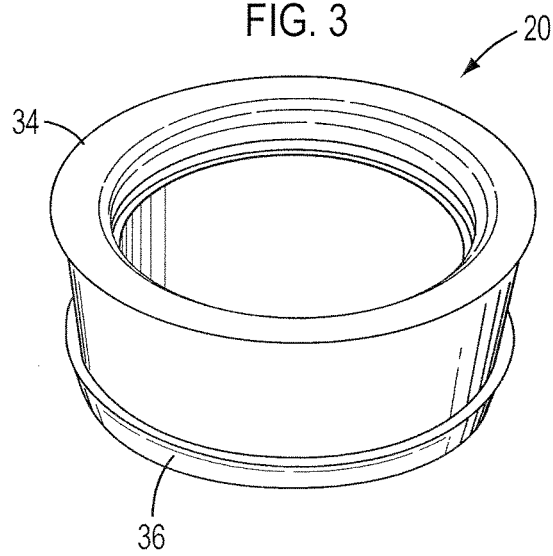
FIG. 3 is a perspective view of an outer bell end adapter of the bell end adapter assembly shown in FIG. 3.
Figure 4:
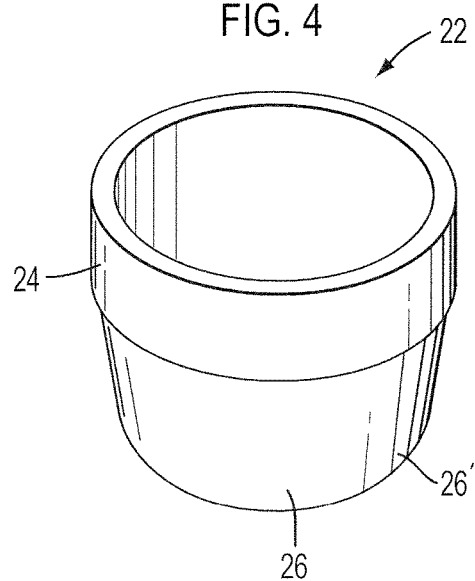
FIG. 4 is a perspective view of an inner sleeve member of the bell end adapter assembly shown in FIG. 3.
Figure 5:
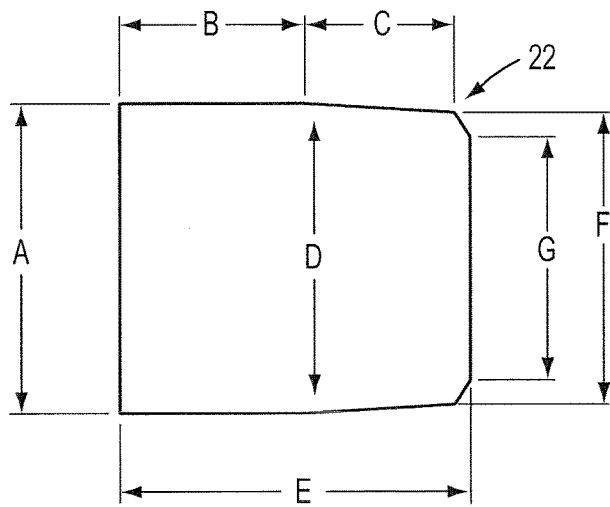
FIG. 5 is a diagram illustrating typical dimensions of an inner sleeve member.

FIGS. 3 and 4, respectively, show the outer bell end adapter 20, and the inner sleeve member 22. It is contemplated that these components are assembled in fixed relationship with each other to form the bell end adapter assembly 10 of the present invention. This can be effected by press-fitting the components together, with one or both of the mating surfaces suitably tapered to facilitate assembly. While a relatively secure press-fit can readily be achieved, the application of a suitable adhesive compound to the components after assembly ensures they remain together in fixed relationship.

In accordance with the present invention, the bell end adapter arrangement is configured to facilitate convenient and efficient connection of first and second sections of electrical conduit, which sections may typically comprise PVC. The invention contemplates disposition of a first conduit section 30 in the concrete slab 12, with the present adapter assembly 10 configured from fitment and securement to the first section, with the adapter assembly 10 extending above the surface of the concrete slab. This arrangement facilitates connection of a second conduit section 32 to the first section 30 by insertion of the second section 26 into the adapter 10, thus permitting electrical wiring or the like to extend from the first section 30 within the concrete slab, through the internal passage of the adapter assembly 10, and into the second conduit section 32. Securement of the second conduit section to the adapter 10 can be effected with an adhesive composition, but it is within the purview of the present invention that suitable mechanical fasteners can be employed. Efficient placement of associated electrical components is thus facilitated.

In accordance with the illustrated embodiment, the present bell end adapter assembly 10 is positioned to extend from within the concrete slab 12 to above the slab, with the first conduit section 30 positioned within the concrete slab, as typically found in a construction environment. The present arrangement further comprises the second conduit section 32, positioned above the slab 12, which is arranged for connection to the first conduit section by the present bell end adapter assembly 10. The associated electrical wiring, cables, or the like ordinarily extend from within the first conduit section 30, and are threaded and directed through the adapter assembly 10 and into the second conduit section 32 attendant assembly and use.

To facilitate efficient use, the second end 18 of the adapter assembly 10 has an outwardly flared configuration, to facilitate insertion of the second section 32 of electrical conduit into the adapter assembly. To facilitate assembly, the inner sleeve member 22 of the adapter assembly 10 defines an annular stop surface 38 for engagement with the second conduit section 32.

To facilitate assembly and to ensure secure fitment, an outer surface 26' of the inner sleeve member 22, at the first end 16 on the adapter assembly, preferably has an inwardly tapered configuration (in a direction toward the lower free end of the sleeve member) while an inside surface of the first conduit section 30, positioned in the concrete slab 12, has an outwardly tapered configuration for receiving the tapered outer surface of the inner sleeve member 22 in mating relationship. In the preferred form, the inwardly tapered configuration of the outer surface 26' of the inner sleeve member 22 is tapered about 3 degrees, with the inner surface of the first conduit section 30 similarly tapered.

In this regard, an important aspect of the present invention which facilitates secure fitment and assembly contemplates that the tapered inner surface of the first conduit section is reamed prior to assembly of the components. A reaming apparatus can be inserted into the conduit section 30, either before or after pouring of the concrete, thus providing the desired surface for mating engagement with the outer tapered surface 26' of the inner sleeve member 22 of the adapter assembly 10.

Secure fitment and assembly of the components of the present invention can be effected by the provision of an adhesive composition on the tapered, mating surfaces of the components, including at an interface of the tapered surface 26' of the inner sleeve member 22 of the adapter assembly with the first section 30 of electrical conduit to secure the adapter assembly 10 to the first conduit section 30.

Notably, an inside diameter of the inner sleeve member 22 of the adapter assembly 10 is the same as an inside diameter of the first conduit section 30. These inside diameters are also preferably the same as an inside diameter of the second conduit section 32, thus facilitating routing of wiring or cables without snagging or the like.

In the illustrated embodiment, the adapter body 14 includes first and second, vertically spaced flanges 34, 36 on an exterior surface thereof. These facilitate handling and assembly with associated components.

Notably, the bell end adapter of the present invention can be assembled with the associated components either prior to pouring the concrete slab, or after the slab has been poured.

The bell end adapter assembly of the present invention can be made from a variety of materials such as PVC, metal, and other materials known to those skilled in the art.

The present bell end adapter assembly may be suitably sized for use with a variety of sized of conduit sections. By way of example, the bell end adapter assembly can be sized for use with ½"-4" ID conduit. Depending upon the specific size of the conduit sections, the bell end adapter assembly 10 can be sized to extend up to about 2 to 3 inches above the surface of the concrete slab 12. However, it should be understood by those skilled in the art that other sizes of conduit are also contemplated.

Furthermore, the present bell end adapter assembly may be suitably for used with a variety of types of electrical conduit and related components, which may be made from a variety of different materials. For example, the adapter assembly may be suitable for use with an electrical elbow or an electrical conduit extending in the concrete slab. These components may be made from a variety of materials such as thin wall steel, heavy wall steel, PVC and other materials known to those skilled in the art. Additionally, flexible electrical tubing may also be used with the transition coupling.

While the present bell end adapter assembly has been described herein as extending into the surface of the concrete slab, the adapter assembly can also be installed so as to be positioned above the surface of the concrete slab. Additionally, it should be understood that the present adapter assembly has been described herein in relation to a concrete slab, the arrangement may also be used in a variety of other situations as understood by those skilled in the art.

Use and installation of the present invention will be readily apparent from the above description. Typically, the first conduit section 30, which may comprise an elbow section, will be positioned within the associated concrete slab 12, with electrical wiring and/or cables extending from within the conduit section. The upper end of the conduit section may be ground or cut to be flush and even with the surface of the concrete slab, and is then preferably reamed to provide the desired tapered inside surface for receiving the tapered outside surface 26' of the inner sleeve member 22 of the bell end adapter assembly 10.

Wiring and/or cables within the first conduit section 30 are directed through the interior passage of the adapter assembly 10, and the adhesive composition is applied to at least one of the cooperating tapered, mating surfaces the adapter assembly 10 and the conduit section 30. The adapter assembly 10 can them be firmly secured and connected to the conduit section 30, such that the adapter assembly extends above the surface of the concrete slab. The wiring and/or cables extend through the adapter assembly and out of upper end thereof. The associated second conduit section 32 can then receive the wiring therethrough and can then be secured, such as by a suitable adhesive composition to the adapter assembly 10.

From the foregoing, it will be observed that numerous modifications and variations of the present invention can be effected without departing from the true spirit and scope of the novel concept of the present invention. It is to be understood that no limitation with respect to the specific embodiment illustrated herein is intended or should be inferred. The disclosure is intended to cover by the appended claims all such modifications as fall within the scope of the claims.

The invention claimed is:

1. A bell end adapter arrangement, comprising:
   a concrete slab;
   a first section of electrical conduit positioned in the concrete slab;
   a second section of electrical conduit; and
   a bell end adapter assembly having a tubular configuration with an axis, including a first end defining a first opening for disposition in said first section of electrical conduit, and a second end defining a second opening for receiving said second section of electrical conduit, said adapter assembly extending above said concrete slab with the second end thereof being accessible to facilitate connection of said second conduit section thereto,
   said bell end adapter assembly comprising an outer bell end adapter positioned entirely outside the concrete slab, and an inner sleeve member extending below said outer bell end adapter, said inner sleeve member having an upper portion disposed within said bell end adapter, and a lower portion extending below said bell end adapter and extending into said first section of electrical conduit and within the concrete slab,
   said inner sleeve member having an inside surface with a substantially constant diameter over an entire axial extent of the inner sleeve member.

2. A bell end adapter arrangement in accordance with claim 1, wherein
   said second opening defined by said second end of said bell end adapter assembly has an outwardly flared configuration to facilitate insertion of said second section of electrical conduit into said adapter assembly.

3. A bell end adapter arrangement in accordance with claim 1, wherein
   an outer surface of said inner sleeve member at said first end of said bell adapter assembly has a straight inwardly tapered configuration, as viewed orthogonally to a plane containing the axis, extending up to the first end of the bell adapter assembly, and an inside surface of said first conduit section has an outwardly tapered configuration for receiving said outer surface of said inner sleeve member.

4. A bell end adapter arrangement in accordance with claim 3, wherein
said inside surface of said first conduit section is reamed.

5. The bell end adapter arrangement in accordance with claim 3 wherein the straight inwardly tapered configuration extends over at least one third of an axial dimension of the inner sleeve member.

6. A bell end adapter arrangement in accordance with claim 1, wherein
said outer surface of said inner sleeve member has an inwardly tapered configuration on the order of 3 degrees.

7. A bell end adapter arrangement in accordance with claim 1, wherein
said outer bell end adapter includes first and second, vertically spaced flanges on an exterior surface thereof, one each at axial ends of the outer bell adapter.

8. A bell end adapter arrangement in accordance with claim 1, including
an adhesive composition provided at an interface of said outer surface of said inner sleeve member with said first section of electrical conduit to secure said adapter assembly to said first conduit section.

9. A bell end adapter arrangement in accordance with claim 1, wherein
said inner sleeve member defines an annular stop surface for engagement with said second conduit section.

10. A bell end adapter arrangement in accordance with claim 1, wherein
the diameter of the inside surface of said inner sleeve member is the same as an inside diameter of said first section of electrical conduit.

11. The bell end adapter arrangement in accordance with claim 1 wherein the first conduit section has an inside surface with a diameter and the diameters of the inside surfaces of the inner sleeve member and the first conduit section are the same.

12. A bell end adapter arrangement, comprising:
a concrete slab;
a first section of electrical conduit positioned in the concrete slab;
a second section of electrical conduit; and
a bell end adapter assembly having a tubular configuration with an axis, including a first end defining a first opening for disposition in said first section of electrical conduit, and a second end defining a second opening for receiving said second section of electrical conduit, said adapter assembly extending above said concrete slab with the second end thereof being accessible to facilitate connection of said second section of electrical conduit thereto,
said bell end adapter assembly comprising an outer bell end adapter, and an inner sleeve member extending within and below said bell end adapter, said inner sleeve member having an upper portion disposed within said bell end adapter, and a lower portion extending below said bell end adapter and extending into said first section of electrical conduit and within the concrete slab,
said inner sleeve member including an outer surface at said first end of said bell adapter assembly having an inwardly tapered configuration, said first conduit section including an inside surface having an outwardly tapered configuration for receiving said outer surface of said inner sleeve member,
wherein the second end of the bell end adapter has a tapered shape, where the second section of electrical conduit is initially introduced into the bell end adapter, to guide direction of the second section of electrical conduit axially into the second end of the bell end adapter assembly.

13. A bell end adapter arrangement in accordance with claim 12, including
an adhesive composition provided at an interface of said outer surface of said inner sleeve member with said first conduit section to secure said adapter assembly to said first conduit section.

14. A bell end adapter arrangement in accordance with claim 12, wherein
said inner sleeve member defines an annular stop surface for engagement with said second conduit section.

* * * * *